US00RE35933E

United States Patent [19]

Scholl

[11] E Patent Number: Re. 35,933

[45] Reissued Date of Patent: Oct. 27, 1998

[54] PAINT HOLDER AND DELIVERY DEVICE

[75] Inventor: Robert Scholl, Ramsey, N.J.

[73] Assignee: R. B. Schnel, Inc., Ramsey, N.J.

[21] Appl. No.: 764,326

[22] Filed: Dec. 12, 1996

Related U.S. Patent Documents

Reissue of:

[64] Patent No.: 5,549,216
Issued: Aug. 27, 1996
Appl. No.: 441,343
Filed: May 15, 1995

[51] Int. Cl.[6] ..... B65D 1/36

[52] U.S. Cl. ..... 220/695; 220/696; 220/697; 220/698; 220/736; 220/737; 220/738; 222/572

[58] Field of Search ..... 220/695, 696, 220/697, 698, 735, 736, 737, 738, 23.83, 572

[56] References Cited

U.S. PATENT DOCUMENTS

| | | | |
|---|---|---|---|
| 4,061,242 | 12/1977 | Donlon | 220/695 |
| 4,164,299 | 8/1979 | Fultr | 220/697 |
| 4,491,234 | 1/1985 | Wilcock | 220/697 |
| 4,860,891 | 8/1989 | Biggio | 220/697 |
| 4,927,046 | 5/1990 | Armstrong | 206/697 |
| 5,054,661 | 10/1991 | Hollje | 220/697 |
| 5,297,695 | 3/1994 | Provence | 220/695 |
| 5,392,969 | 2/1995 | Usery | 220/695 |
| 5,400,916 | 3/1995 | Weber | 220/697 |

*Primary Examiner*—Joseph M. Moy
*Attorney, Agent, or Firm*—Hoffmann & Baron, LLP

[57] ABSTRACT

A paint holder and delivery device comprising a container. A disposable insert fits within the container to facilitate the application of paint with a paintbrush.

10 Claims, 2 Drawing Sheets

Fig. 2
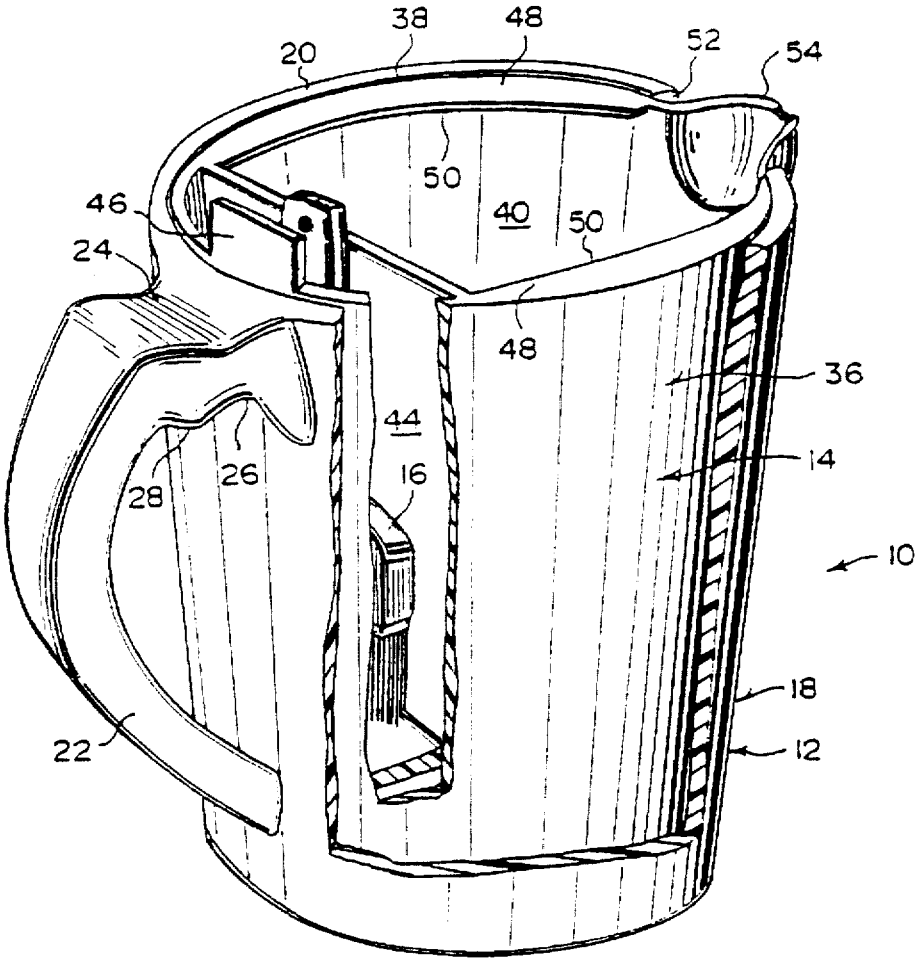
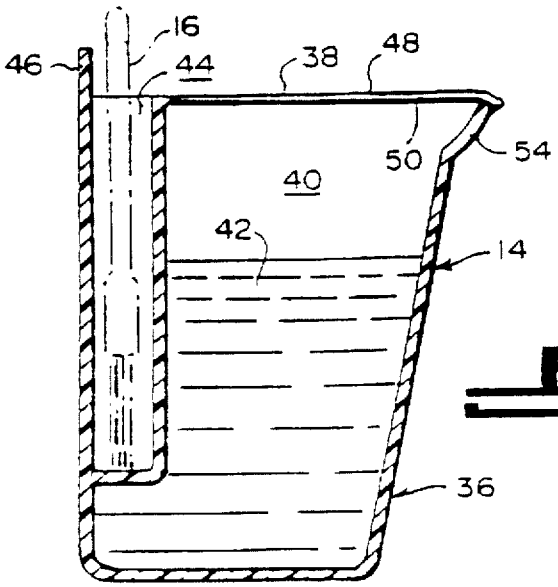
Fig. 3

PAINT HOLDER AND DELIVERY DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The instant invention relates generally to painting tools and more specifically it relates to a paint holder and delivery device.

2. Description of the Prior Art

Numerous painting tools have been provided in prior art that are adapted to be used by painters in painting various surfaces. While these units may be suitable for the particular purpose to which they address, they would not be as suitable for the purposes of the present invention as heretofore described.

SUMMARY OF THE INVENTION

A primary object of the present invention is to provide a paint holder and delivery device that will overcome the shortcomings of the prior art devices.

Another object is to provide a paint holder and delivery device that consists of a container with a disposable insert, used to facilitate the application of paint with a paint brush.

An additional object is to provide a paint holder and delivery device, in which a handle on the outer container permits the user to hold and carry the equivalent of a quart size can of paint in the internal disposable insert, while the ladder strap on the outer container allows it to be suspended from a ladder for above ground use.

A further object is to provide a paint holder and delivery device that is simple and easy to use.

A still further object is to provide a paint holder and delivery device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 2 is an assembled perspective view of the instant invention with parts broken away and in section.

FIG. 3 is a cross sectional view taken through the disposable insert as indicated by line 3—3 in FIG. 1.

Similar reference characters denote corresponding features consistently throughout the attached drawings.

DETAILED DESCRIPTION OF THE PREFERRED EMBODIMENTS

Figure 1:
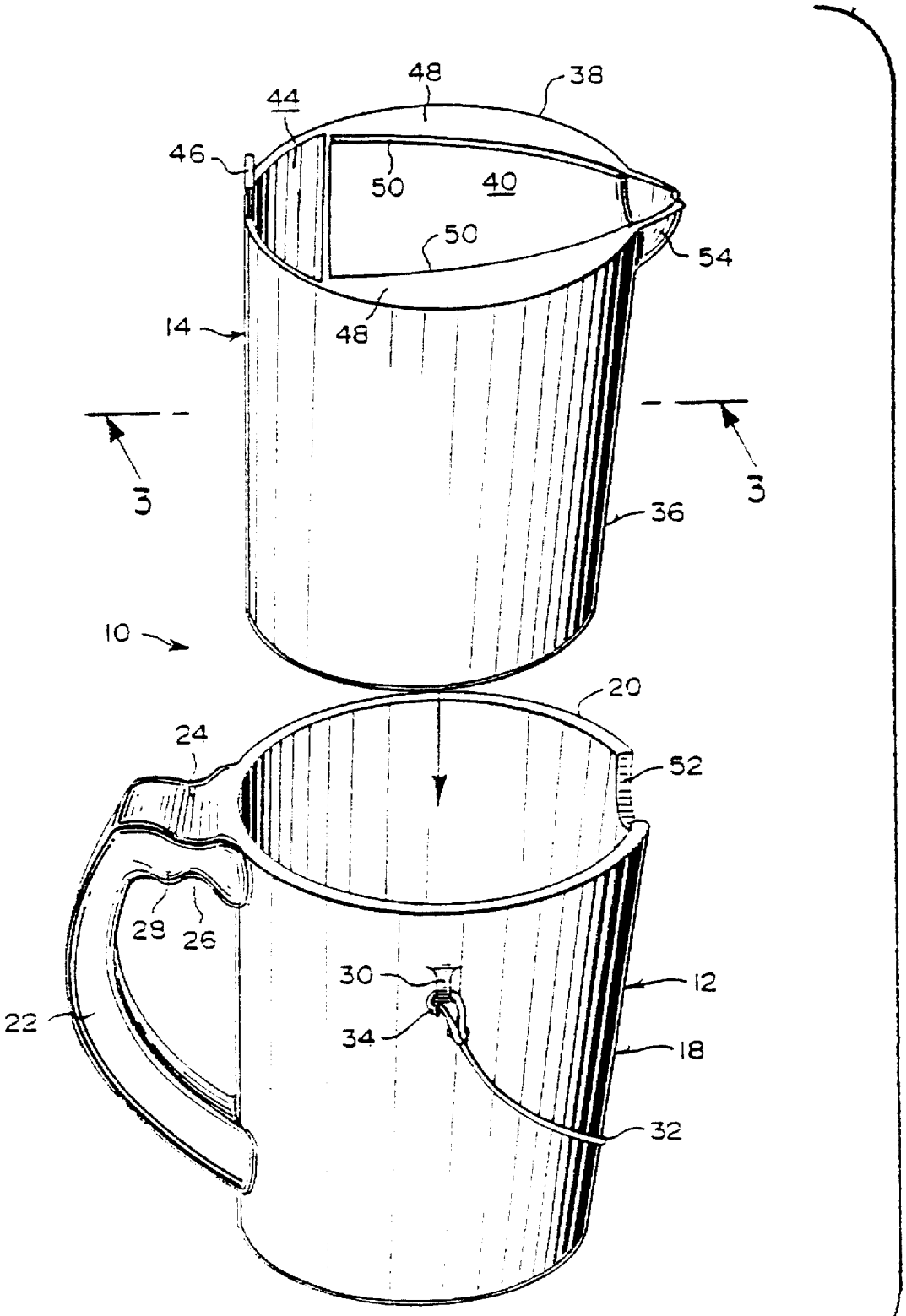
FIG. 1 is an exploded perspective view of the instant invention.

Turning now descriptively to the drawings, in which similar reference characters denote similar elements throughout the several views, FIGS. 1 and 2 illustrate a paint holder and delivery device 10, comprising a container 12. A disposable insert 14 fits within the container 12, to facilitate the application of paint with a paintbrush 16.

The container 12 includes a tapered cylindrical housing 18 having a wide open top end 20, to receive the disposable insert 14 therein. The container 12 contains a handle 22, so that a person can grip the handle 22 in comfort to carry the container 12.

The handle 22 is flared out on both sides, in order to dispense weight of the full container 12 across an entire upper forefinger area in the handle 22. The center of the fared handle 22 has a recessed upper area 22, to enable the person to exert a downward pressure with a thumb to stabilize the container 12.

The underside of an upper end of the handle 22 has a recessed lower area 26 for the forefinger and is followed by a lower protrusion 28, to help stabilize the container 12. The container 12 further comprises a pair of attachment rings 30, one of which is shown in FIG. 1. Each attachment ring 30 is vertically formed on an opposite side thereof, a ladder strap 32 is provided.

A pair of snap fasteners 34 are also provided. Each said snap fastener 34 is fitted upon one end of the ladder strap 32. The ladder strap 32 can be placed over a rung of a ladder with each snap fastener 34 attached to one attachment ring 30, to suspend the container 12 from the rung of the ladder for above ground use.

The disposable insert 14, as shown in FIGS. 1, 2 and 3, includes a tapered cylindrical body 36 having a wide open top end 38 and is sized to fit within the container 12. The cylindrical body 36 has a paint reservoir 40, to hold a quantity of plaint 42 therein. The disposable insert 14 contains a paintbrush storage compartment 44, to hold the paintbrush therein when not in use.

A pull tab 46 extends upwardly from the wide open top end 38, to enable a person to easily remove the disposable insert 14 from the container 12. A pair of flanges 48 extend over the paint reservoir 40 on opposite sides of the wide open top end 38, to provide surfaces for removal and recapture of excess paint from the paintbrush 16. An inside edge 50 of each flange 48 is angled downwardly, to expedite the return of the paint into the paint reservoir 40 of the disposable insert 14.

The pull tab 46 is flexible. This permits a person to bend the pull tab 46 rearwardly and hold the pull tab 46 down while pouring paint from the disposable insert 14, in order to prevent the disposable insert 14 from moving forward ut of the container 12. The container 12 has a cutout area 52 at the wide open top end 20.

The disposable insert 14 has a dripless pour spout 54 on a wide open top end 38. When the disposable insert 14 is placed within the container 12, the dripless pour spout 54 will fit into the cutout area 52 in the container 12. The pour spout 54 can be used to safely pour the remaining paint 42 back into an original paint can for storage.

LIST OF REFERENCE NUMBERS

10 paint holder and delivery device
12 container of 10
14 disposable insert of 10
16 paintbrush
18 tapered cylindrical housing of 12
20 wide open top end of 18
22 handle on 12

24 recessed upper area on 22
26 recessed lower area on 22
28 lower protrusion of 22
30 attachment ring on 12
32 ladder strap
34 snap fastener on 32
36 tapered cylindrical body of 14
38 wide open top end of 36
40 paint reservoir in 36
42 paint in 40
44 paintbrush storage compartment in 14
46 pull tab on 38
48 flange on 38
50 inside edge of 48
52 cutout area in 20
54 dripless pour spout on 38

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A paint holder and delivery device comprising:

a) a container consisting of a tapered cylindrical housing having a wide open top end and vertically extending handle means on the outside of said housing with a recessed upper area of said handle means to enable the person to exert a downward pressure with a thumb to stabilize said container and a recessed lower area of said handle means for the forefinger followed by a lower protrusion to help stabilize said container; and b) a disposable insert to fit within said container to facilitate the application of paint with a paint brush having a reservoir for paint and a paintbrush storage compartment to hold a paintbrush therein when not in use, said insert including a flexible pull tab extending upwardly from a top edge of said insert to enable a person to easily remove said insert from said container, said disposable insert also including a pair of flaps extending inwardly over said paint reservoir on opposite sides of said wide open top end to provide edges for removal and recapture of excess paint from the paint brush.

2. A paint holder and delivery device as recited in claim 1, wherein said container includes:

a) a pair of attachment rings, whereby each said attachment ring is vertically formed on an opposite side thereof;

b) a ladder strap; and c) a pair of snap fasteners, whereby each said snap fastener is fitted upon one end of said ladder strap, said ladder strap can be placed over a rung of a ladder with each said snap fastner attached to one said attachment ring to suspend said container from the rung of the ladder for above ground use.

3. A paint holder and delivery device as recited in claim 1, wherein an inside edge of each said flange is angled downwardly, to expedite the return of the paint into said paint reservoir of said disposable insert.

4. A paint holder and delivery device as recited in claim 3, further including:

a) said container having a cutout area at the wide open top end; and b) said disposable insert having a dripless pour spout, on a wide open top end when disposable insert is placed within said container said dripless pour spout will fit into said cutout area in said container, whereby said pour spout can be used to safely pour the remaining paint back into an original paint can for storage.

*5. A paint holder and delivery device comprising:*

*a) a container having a generally cylindrical housing with an open top end and a vertically oriented C-shaped handle disposed on an outside surface of said housing; and*

*b) a removable insert adapted to fit within said housing comprising:*

*i) a first open-ended compartment adapted to receive a fluid;*

*ii) a second open-ended compartment adapted to receive a brush adjacent said first compartment;*

*iii) a tab extending from the top of said second compartment and resting on a upper surface of said C-shaped handle for securing said insert to said housing during manipulation thereof; and*

*iv) a pair of flanges extending circumferentially around an upper surface of said insert.*

*6. The paint holder of claim 5, wherein said container further includes at least two securing mechanisms disposed on said outer surface of said housing and an attachment device having a first and second end adapted to releasably interlock with said securing mechanisms.*

*7. The paint holder of claim 5, wherein said flanges extend outwardly from said insert to prevent fluid from being trapped between said insert and said housing.*

*8. The paint holder of claim 5, wherein said housing further comprises a cut out area adapted to receive a pour spout.*

*9. The paint holder of claim 5, wherein said insert further comprises a pour spout on an upper surface thereof.*

*10. The paint holder of claim 5, wherein said insert further comprises a second pair of flanges extending vertically over said housing to provide wiping surfaces for removing excess liquid from said brush.*

* * * * *